(12) United States Patent
Sant-Miller et al.

(10) Patent No.: US 10,805,343 B2
(45) Date of Patent: Oct. 13, 2020

(54) NETWORK SECURITY USING ARTIFICIAL INTELLIGENCE AND HIGH SPEED COMPUTING (71) Applicant: Booz Allen Hamilton Inc., McLean, VA (US)

(72) Inventors: Aaron Sant-Miller, McLean, VA (US); Greg McCullough, McLean, VA (US); James Blaha, McLean, VA (US); Morris LaGrand, McLean, VA (US); Rachel Allen, McLean, VA (US); Peter Guerra, McLean, VA (US); Patrick Beggs, McLean, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/167,095

(22) Filed: Oct. 22, 2018

(65) Prior Publication Data
US 2020/0128025 A1 Apr. 23, 2020

(51) Int. Cl.
H04L 29/06 (2006.01)
G06N 5/02 (2006.01)
G06N 20/00 (2019.01)

(52) U.S. Cl.
CPC ............ *H04L 63/145* (2013.01); *G06N 5/02* (2013.01); *G06N 20/00* (2019.01)

(58) Field of Classification Search
CPC .............. H04L 63/145; H04L 63/1458; H04L 63/1466; G06N 5/00; G06N 5/02
See application file for complete search history.

(56) References Cited

U.S. PATENT DOCUMENTS

| | | | | |
|---|---|---|---|---|
| 7,475,405 B2* | 1/2009 | Manganaris | .......... | G06F 21/552 706/45 |
| 8,046,835 B2* | 10/2011 | Herz | .................... | H04L 63/145 726/25 |
| 8,887,281 B2* | 11/2014 | Honig | .................... | H04L 63/14 726/23 |
| 8,893,273 B2* | 11/2014 | Honig | .................... | G06F 16/13 726/23 |
| 9,306,966 B2* | 4/2016 | Eskin | .................. | H04L 63/1425 |
| 9,479,518 B1* | 10/2016 | Fang | ...................... | G06F 21/552 |
| 9,516,053 B1* | 12/2016 | Muddu | ................. | G06F 16/254 |
| 10,122,747 B2* | 11/2018 | Mahaffey | ................ | H04L 43/10 |
| 2003/0196123 A1* | 10/2003 | Rowland | ............... | G06F 21/552 726/23 |
| 2004/0015719 A1* | 1/2004 | Lee | ..................... | H04L 63/0227 726/23 |

(Continued)

*Primary Examiner* — Linglan E Edwards
(74) *Attorney, Agent, or Firm* — Buchanan Ingersoll & Rooney PC (57) ABSTRACT A method for securing a network by applying one or more artificial intelligence (AI) models in a computing environment with a computing speed selected as a function of a bandwidth of the network. The method includes receiving data at a node associated with the network, and identifying a suspected cyber adversarial event at the network. The method includes applying an AI model on the data in real-time to enrich the data with information that indicates behavior associated with an exploitation of the network, and analyzing the enriched data as part of a cyber workflow for an indication of a compromise associated with the exploitation of the network.

22 Claims, 6 Drawing Sheets (56) References Cited

U.S. PATENT DOCUMENTS

| | | | |
|---|---|---|---|
| 2013/0031633 A1* | 1/2013 | Honig | G06F 21/554 |
| | | | 726/23 |
| 2013/0219498 A1* | 8/2013 | Lee | G06F 21/56 |
| | | | 726/23 |
| 2013/0304676 A1* | 11/2013 | Gupta | G06N 20/00 |
| | | | 706/12 |
| 2014/0157405 A1* | 6/2014 | Joll | H04L 63/1425 |
| | | | 726/22 |
| 2016/0232349 A1* | 8/2016 | Baeder | H04W 4/12 |
| 2017/0093902 A1* | 3/2017 | Roundy | H04L 63/1416 |
| 2018/0063162 A1* | 3/2018 | Baughman | H04L 63/1416 |
| 2018/0183696 A1* | 6/2018 | Chang | H04L 47/2416 |
| 2019/0005237 A1* | 1/2019 | Long | G06N 3/0445 |

* cited by examiner

FIG. 2: Node Device Architecture Functions For Malicious Domain Detection

FIG. 3: Node Device Architecture Functions For Malware Detection

FIG. 4: Node Device Architecture Functions For Credential Misuse Detection

FIG. 5: Node Device Architecture Functions For Detecting A Network Protocol Issue

FIG. 6

NETWORK SECURITY USING ARTIFICIAL INTELLIGENCE AND HIGH SPEED COMPUTING

FIELD

An aspect of the present disclosure provides a method, a device, and a computer readable medium for securing a network.

BACKGROUND INFORMATION

Almost all networks, regardless of physical or logical architecture encounter information security challenges. In some cases, these challenges are even more pronounced as cyber-attacks on networks are becoming more complex than ever before and adversaries are becoming increasingly sophisticated and creative in how they exploit cyber vulnerabilities.

Known techniques for thwarting cyber-attacks that compromise a network involve cyber defenders/analysts sifting through massive amounts of historical data and known attack codes to create rule-based, heuristic-based, and signature-based defenses to uncover previously undetected cyber-attacks. For example, cyber analysts are aware of previously detected attack signatures adversaries have used in the past to gain unauthorized access to a network. In order to prevent these malicious attempts that are based on known attack signatures, analysts may create rules that prevent the same type of event from occurring again.

One of the many disadvantages with these known human-driven techniques for thwarting cyber-attacks is that they do not scale with the shortage of cyber talent and are very sluggish. In some cases, the known human-driven techniques, which are employed in poorly configured cyber-related products, tools and technologies (e.g., firewalls), detect a network intrusion, on average, two-hundred days after the intrusion occurred.

To overcome these disadvantages, there has been a recent push to incorporate Machine Learning/Artificial Intelligence techniques into cyber products, tools, and technologies. However, these techniques consistently produce high false positive rates. That is, these techniques produce a remarkable number of alerts, which cause cyber analysts to spend a significant amount of time investigating the alerts without finding anything of significance. Additionally, the general concept of Machine Learning, e.g., anomaly detection, in cyber security products, tools, and technologies does not work because it essentially monitors human action on the network, which is inherently anomalous.

Even if an effective Machine Learning technique is developed, by the time it is trained and deployed the technique is already out of date. Therefore, developing a model for network security based solely on the above techniques that allows for an effective batch training of models, pre-training of models, or transfer of learning from a model into a cyber solution, is not feasible at a large scale. This presents many technical challenges regarding the effectiveness of the above described Machine Learning/Artificial Intelligence techniques.

The present disclosure provides a technical solution to the previously described technical challenges by using artificial intelligence (AI) models in a computing environment, as described herein.

SUMMARY

A method (e.g., downloadable computer executable code) for securing a network by applying one or more artificial intelligence (AI) models in a computing environment with a computing speed selected as a function of a bandwidth of the network is disclosed. The method includes receiving data at a node associated with the network; identifying a suspected cyber adversarial event at the network; applying an AI model on the data in real-time to enrich the data with information that indicates behavior associated with an exploitation of the network; and analyzing the enriched data as part of a cyber workflow for an indication of a compromise associated with the exploitation of the network.

A device for securing a network by applying one or more artificial intelligence (AI) models in a computing environment with a computing speed selected as a function of a bandwidth of the network is disclosed. The device includes a processor configured to: receive data from a source; identify a suspected cyber adversarial event at the network; apply an adaptive AI model on the data in real-time to enrich the data with information that indicates behavior associated with an exploitation of the network; and analyze the enriched data as part of a cyber workflow for an indication of a compromise associated with the exploitation of the network.

A non-transitory computer-readable medium having computer-executable instructions for securing a network by applying one or more artificial intelligence (AI) models in a computing environment with a computing speed selected as a function of a bandwidth of the network is disclosed. The computer-executable instructions are executed on a processor and comprise the steps of: receiving data at a node associated with the network; identifying a suspected cyber adversarial event at the network; applying an AI model on the data in real-time to enrich the data with information that indicates behavior associated with an exploitation of the network; and analyzing the enriched data as part of a cyber workflow for an indication of a compromise associated with the exploitation of the network.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

An aspect of the present disclosure provides a technical solution to the aforementioned issues with network security by creating an optimized enrichment pipeline that can take network data as it comes off various sensor technologies at the edge or in a data center. This technical solution can parse and process the data, and apply AI models on the data in real-time (i.e., inference) to create an enriched output that can seamlessly integrate with existing cyber defense and monitoring products and tools that are used by cyber defenders/analysts. These features of the technical solution can enable cyber defenses to evolve at the same pace as adversaries and also mitigate the false positives and general inefficiencies of Machine Learning techniques in existing cyber products and tools.

Exemplary embodiments of cyber workflows supported by the solution can include, but are not limited to, malware detection, domain generated algorithm detection, credential misuse detection, and behavioral modeling focused on beaconing.

An aspect of the present disclosure provides a method that can be implemented by one or more node device architectures. The method can include securing a network by applying one or more artificial intelligence (AI) models in a computing environment with a computing speed selected as a function of a bandwidth of the network.

In an exemplary embodiment, the network can be, but is not limited to, a computer network, a data network, or a digital telecommunications network. The network can allow nodes operating in the network to share resources with each other using connections (data links) between nodes. These data links can be established over cable media such as wires or optic cables, or wireless media such as WiFi.

Network security can relate to the policies and practices adopted to prevent and monitor unauthorized access, misuse, modification, or denial of a network and network-accessible resources. Network security can involve the authorization of access to data in a network, which may be controlled by the network administrator. Network security can cover a variety of computer networks, both public and private, that are used in everyday jobs; conducting transactions and communications among businesses, government agencies and individuals. Networks can be private, such as within a company, and others which might be open to public access. Network security can be involved in organizations, enterprises, and other types of institutions.

In an exemplary embodiment, the one or more AI models include any model that can perceive its environment and take actions that maximize its chance of successfully achieving its goals. The goals can be simple or complex, and can be explicitly defined, or can be induced. The AI models can be programmed for reinforcement learning so that the goals can be implicitly induced by rewarding some types of behavior and punishing others.

In an exemplary embodiment, an evolutionary system can be used in the AI models to induce goals by using a fitness function to mutate and preferentially replicate high-scoring AI models. The AI models can also reason by analogy. Such models are not generally given goals, except to the degree that goals can be imbedded implicitly in their training data. These AI models can be benchmarked if the non-goal system is framed as a system whose "goal" is to successfully accomplish its narrow classification task.

In an exemplary embodiment, the one or more AI models can learn from data, and enhance themselves by learning new heuristics (strategies, or "rules of thumb," that have worked well in the past) or can themselves create other models. The AI models can include, but are not limited to, Bayesian networks, decision trees, and nearest-neighbor. With the right amount of data, time, and memory, these models can learn to approximate any function, including combinations of mathematical functions. The AI models can, therefore, derive a vast amount of knowledge by considering many hypotheses and matching them against the data.

In an exemplary embodiment, the computing environment can be a high-performance computing (HPC) environment that can involve the use of super computers, quantum computers, and parallel processing techniques for solving complex computational problems. HPC technology can focus on developing parallel processing algorithms and systems by incorporating both administration and parallel computational techniques. HPC technology can be scalable and deliver sustained performance through the concurrent use of computing resources, i.e., multi-processing capabilities.

HPC can include the use of, but is not limited to, a large or small supercomputer optimized for multiple thread processing using a cluster of enabled parallel processing nodes (e.g., a Spark or Hadoop cluster).

Figure 1:
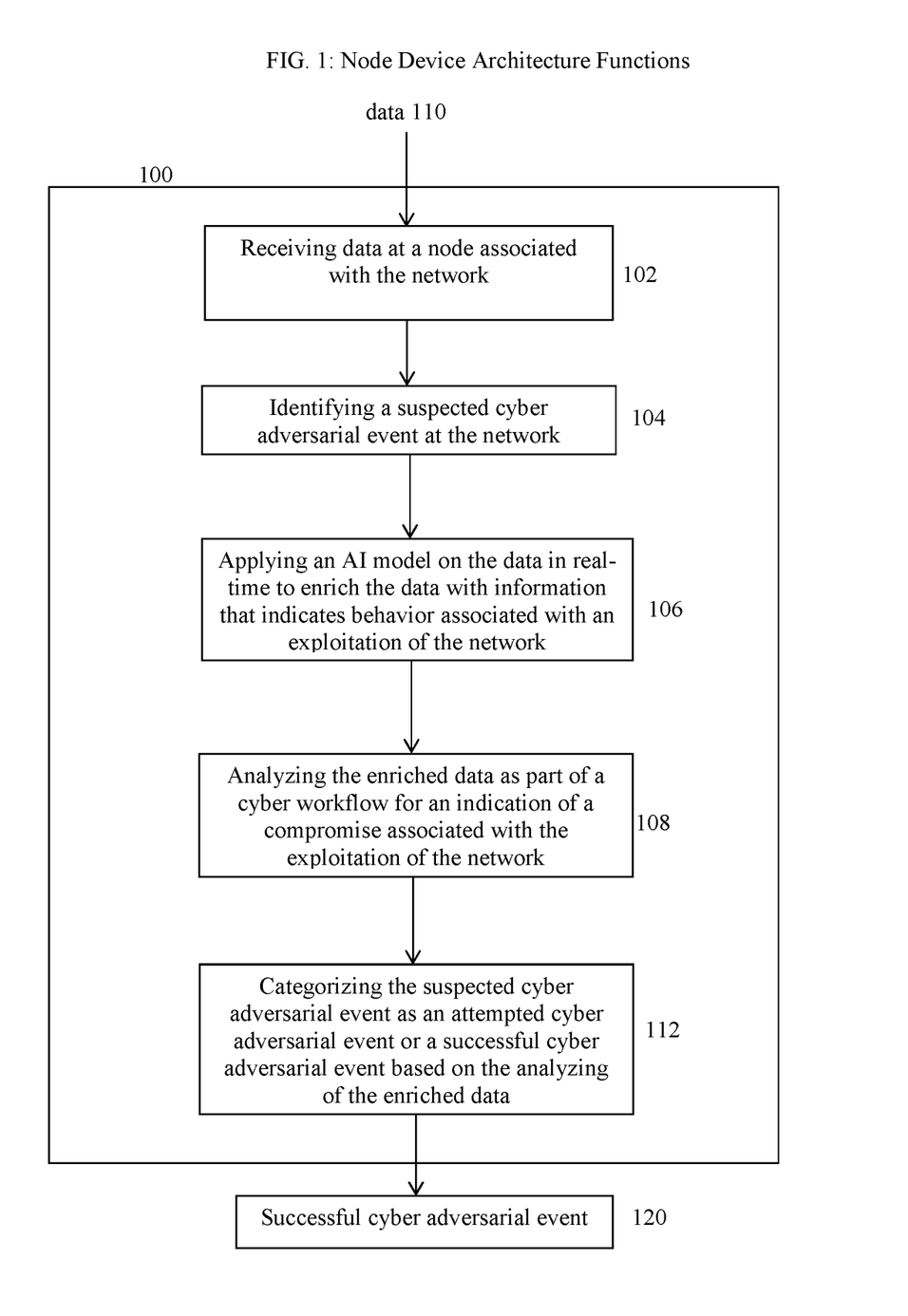
FIG. 1 illustrates exemplary node device architecture functions for implementing an embodiment of the present disclosure.

FIG. 1 shows an exemplary method that can be implemented by node device architecture(s) according to an embodiment of the present disclosure. The FIG. 1 method can include receiving data 110 at a node 100 associated with the network, as shown in step 102.

The node 100 can be a redistribution point or a communication endpoint. The structure and functionality of the node 100 can depend on the network and a protocol layer. The node 100 can be a physical network node, which is an active electronic device attached to a network, capable of creating, receiving, or transmitting information over a communications channel. Examples of the node 100 can include, but are not limited to, modem, hub, bridge or switch, or data terminal equipment (DTE) such as a digital telephone handset, a printer or a host computer.

The FIG. 1 method can include identifying a suspected cyber adversarial event at the network, as shown in step 104. A cyber adversarial event can be any attempt to expose, alter, disable, destroy, steal or gain unauthorized access to or make unauthorized use of any data, device, or other component of the environment or network that supports information-related activities. Cyber adversarial events can be any type of offensive maneuver that targets computer information systems, infrastructures, computer networks, or personal computer devices. Cyber adversarial events can steal, alter, or destroy a specified target by hacking into a susceptible system. Cyber adversarial events can range from installing spyware on a personal computer to attempting to destroy the infrastructure of entire nations.

Cyber adversarial events can include, but are not limited to, computer and network surveillance, wiretapping, fiber tapping, port scan, idle scan, keystroke logging, screen scraping, backdoor, denial-of-service attack, spoofing, man-in-the-middle attack, man-in-the-browser attack, ARP poisoning, ping flood, ping of death, Smurf attack, buffer overflow, heap overflow, stack overflow, or format string attack.

The FIG. 1 method can include applying an AI model on the data 110 in real-time to enrich the data 110 with information that indicates behavior associated with an exploitation of the network, as shown in step 106.

For example, XGBoost model can be used to enrich the data 110. XGBoost model can provide a scalable, portable and distributed gradient boosting (GBM, GBRT, GBDT) library. The XGBoost model can support the distributed processing frameworks Apache Hadoop, Apache Spark, and Apache Flink. Alternatively, in a non-limiting embodiment, a Bayesian model can be used to enrich the data 110.

In exemplary embodiments, the XGBoost model and/or the Bayesian model can enrich the data 110 with information that includes any combination an active number of processes running at a node, an average amount of time between activity per user of a network, number of unique destination computers that that a user connects to, ratio of a number of successful logins and total logins, type of authentication (e.g. NTLM, Kerberos), source types, and number of sources of the data. This enriched data can be used to indicate behavior associated with an exploitation of the network.

Real-time can refer to a system that can provide responses within specified time constraints. The time-constraints can, for example, be of order of milliseconds or lesser or greater. A real-time system can control an environment by receiving data, processing them, and returning the results sufficiently quickly to affect the environment at that time.

A behavior associated with an exploitation of the network can be identified by establishing a baseline of normal network behavior and then continuously monitoring the network for unusual events or trends to identify any exploitation of the network. Behavior of individual nodes of the network and/or any combination of nodes can also indicate a baseline of normal network behavior. Similarly, continuously monitoring the network for unusual events or trends with respect to one or more nodes can identify an exploitation of the network.

Exploitation of the network can include, but is not limited to, virus detection, bandwidth anomaly detection, connection rate detection, and payload anomaly detection for MAC Spoofing, IP Spoofing, TCP/UDP Fanout, IP Fanout, Duplicate IP, or Duplicate MAC.

The FIG. 1 method can include analyzing the enriched data 110 as part of a cyber workflow for an indication of a compromise associated with the exploitation of the network, as shown in step 108. The cyber workflow can include orchestrated and repeatable patterns of cyber activity enabled by a systematic organization of resources that provide network security. In one embodiment, the cyber workflow can emphasize lateral movement, such that multiple components of the workflow may not be linked to one endpoint and instead extend across a network linked through network traffic.

The exploitation of the network can originate from sources within and/or outside the network. The exploitation can be passive, where a network intruder intercepts data traveling through the network, or active where an intruder initiates commands to disrupt the network's normal operation or to conduct reconnaissance and lateral movement to find and gain access to assets available via the network.

The exploitation of the network can be from attacks that include, but are not limited to, wiretapping, port scanner, idle scan, encryption, traffic analysis, virus, eavesdropping, data modification, denial-of-service attack, DNS spoofing, man-in-the-middle, ARP poisoning, VLAN hopping, Smurf attack, buffer overflow, heap overflow, format string attack, SQL injection, phishing, cross-site scripting, CSRF, or any type of cyber-attack An indication of a compromise associated with the exploitation of the network can include any deviation in the ongoing behavior of the network from the historic behavior. This compromise can include, but is not limited to, ransomware messages, network nodes functioning without input, network data being unusually encrypted, unauthorized access, infection of more nodes on the network.

In an exemplary embodiment, the FIG. 1 method can include categorizing the suspected cyber adversarial event as an attempted cyber adversarial event or a successful cyber adversarial event based on the analyzing of the enriched data, as shown in step 112. The FIG. 1 method can include outputting the successful cyber adversarial event 120.

A suspected cyber adversarial event can be considered successful when there is an associated exploitation of the network in any manner, either partially or to the full extent of its intended purpose or even in an unexpected action affect the network. A successful cyber adversarial event can cause the behavior of a network to deviate according to the intended purpose of the cyber adversarial event, or an unintended consequence of the intended purpose or exploitation.

A suspected cyber adversarial event can be considered attempted when it turns out to be a false positive. That is, if the suspected cyber adversarial event has no consequences on the network—intended or unintended, it can be considered attempted.

According to an exemplary embodiment, only a successful cyber adversarial event is outputted. This can reduce a number and frequency of reporting false positives for non-existent cyber adversarial events. The output of the successful cyber adversarial event can be in the form of a display on a monitor, and/or an alarm sound, and/or any other output that alerts the nodes a network and/or equivalents thereof.

According to an exemplary embodiment, both the successful cyber adversarial event and the attempted cyber adversarial event are outputted and stored in a memory. In an exemplary embodiment, one or more nodes associated with the successful cyber adversarial event can be quarantined and/or removed from the network and/or equivalents thereof.

In an exemplary embodiment, the FIG. 1 method can include receiving the data from a source external to the network. In an exemplary embodiment, the method can include receiving the data from a source within the network. The source can be wireless such as Wi-Fi or Bluetooth connection and/or wired such as a data bus or a fiber optic cable. In an exemplary embodiment, the method can include using an adaptive AI model as the AI model.

Figure 2:
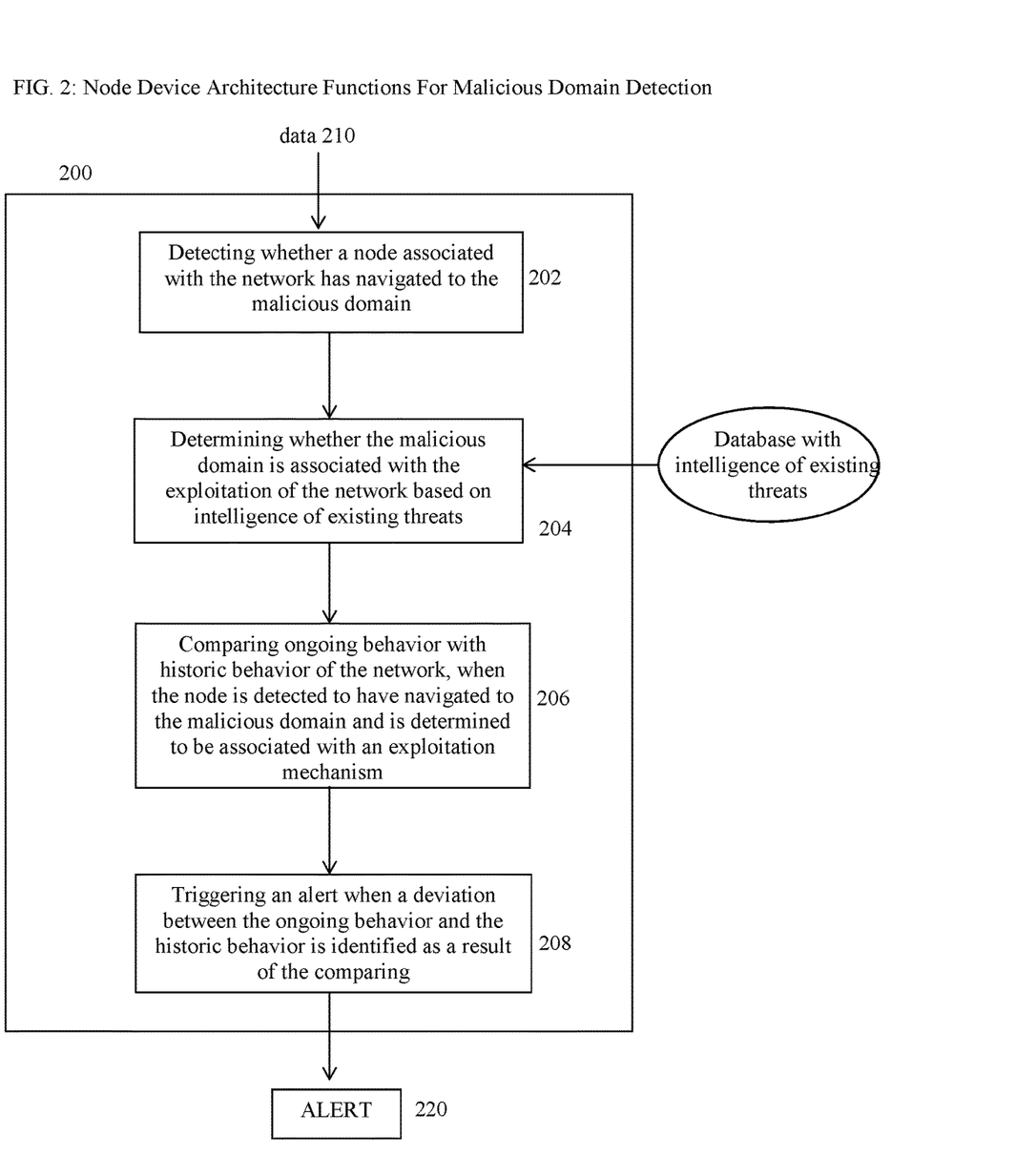
FIG. 2 illustrates exemplary node device architecture functions for implementing malicious domain detection.

FIG. 2 shows an exemplary method that can be implemented by node device architecture(s) according to an embodiment of the present disclosure. The FIG. 2 method can include identifying navigation to a malicious domain as the suspected cyber adversarial event. The malicious domain can be any web domain that can cause damage to a computer, server or computer network. A malicious domain can do damage after it is introduced in some way to a target node or network.

In an exemplary embodiment, any domain that is directly or indirectly associated with the malicious domain can also be considered a malicious domain. The malicious domain can have a malicious intent, or can cause an error, flaw, failure or fault in a computer program, network, device, or system to produce an incorrect or unexpected result, or to behave in unintended ways.

The FIG. 2 method can include detecting whether a node associated with the network has navigated to the malicious domain, as shown in step 202. In an exemplary embodiment, node 200 that is performing this step can be a node associated with the network. In an exemplary embodiment, a node associated with the network can be any node within the network. A node can be considered to have navigated to a malicious domain when it exchanges data, directly or indirectly, with the malicious domain. A node can be considered to have navigated to a malicious domain when it is connected, directly or indirectly, with the malicious domain.

The FIG. 2 method can include determining whether the malicious domain is associated with the exploitation of the network based on intelligence of existing threats, as shown in step 204. The intelligence of existing threats can include, but is not limited to, information that identifies the threats, categorizes the threats, describes techniques to counter the threat, provides an indication of a severity of the threat, and/or identifies network components that can be affected by the threat. Intelligence of existing threats can be derived from a database, which can reside within the network or external to the network. The database can reside within a memory of the node 200.

The memory of the node 200 can be local computer memory that can be a portion of memory designated exclusively to a single unit of the node 200. The local computer memory can also be memory specifically dedicated to a single function or program. The memory can be a remote computer memory that resides on a different node. Depending on the exact configuration and type of computing device, memory can be volatile (such as RAM), non-volatile (such as ROM, flash memory, etc.) or some combination of the two. The memory includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the node 200.

The FIG. 2 method can include comparing ongoing behavior with historic behavior of the network, when the node is detected to have navigated to the malicious domain and is determined to be associated with an exploitation mechanism, as shown in step 206.

A behavior associated with an exploitation of the network can be compared by establishing a historic behavior and then continuously monitoring the network for unusual events or trends. The comparing ongoing behavior with historic behavior of the network can include comparing of ongoing behavior with historic behavior of individual nodes of the network and/or any combination of nodes for unusual events or trends.

The FIG. 2 method can include triggering an alert when a deviation between the ongoing behavior and the historic behavior is identified as a result of the comparing, as shown in step 208. The alert 220 can be triggered when a deviation or strange event or trend is detected that could indicate the presence of a threat. Examples of strange events can include, but are not limited to, an extraordinary deviation in traffic volume, bandwidth use, and protocol use.

Figure 3:
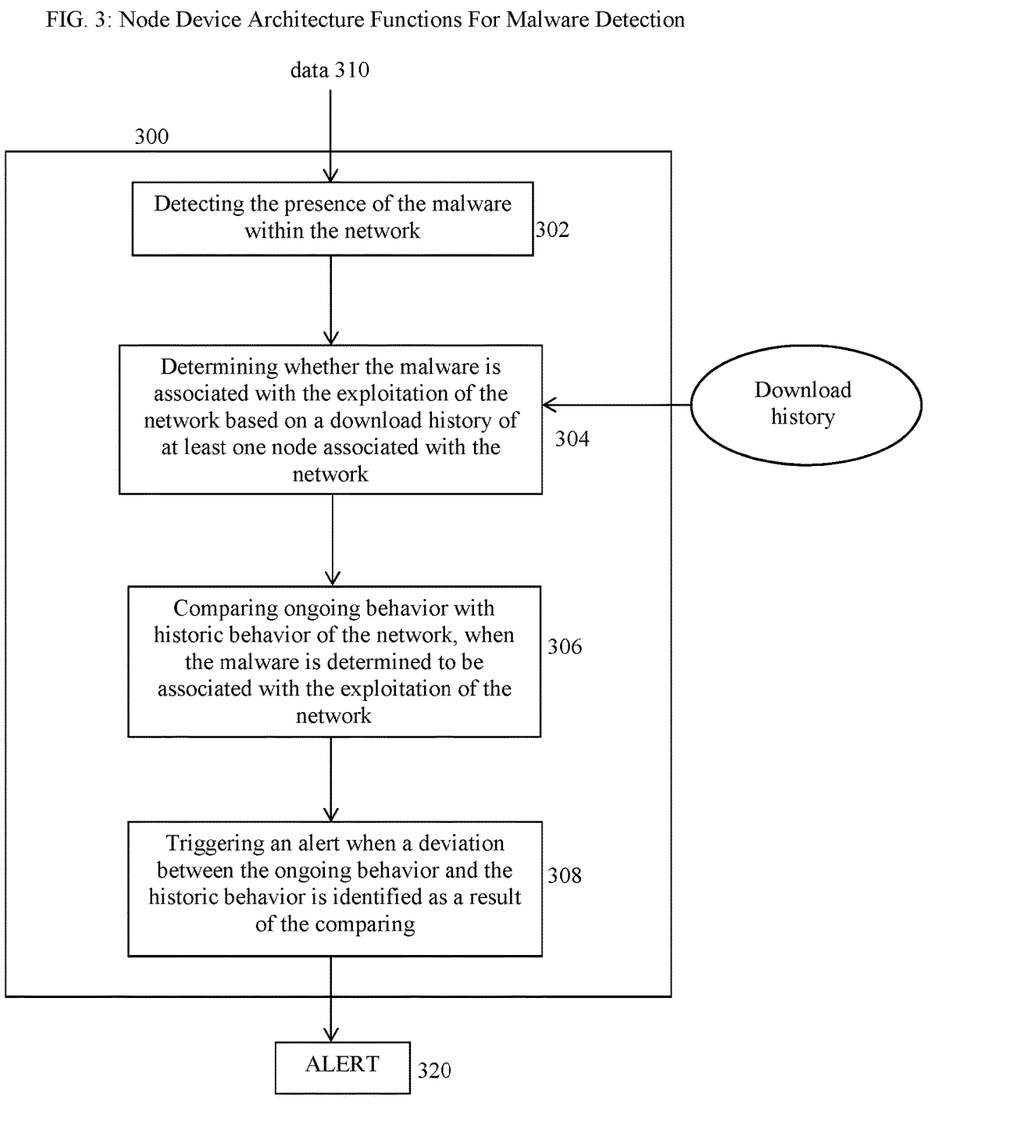
FIG. 3 illustrates exemplary node device architecture functions for implementing malware detection.

FIG. 3 shows an exemplary method that can be implemented by node device architecture(s) according to an embodiment of the present disclosure. The FIG. 3 method can include identifying a presence of a malware as the suspected cyber adversarial event. The malware can be any software that can cause damage to a computer, server or computer network. A malware can do damage after it is implanted or introduced in some way into a target node or network and can take the form of executable code, scripts, active content, and other software such as computer viruses, worms, Trojan horses, ransomware, spyware, adware, and scareware, among other types.

In an exemplary embodiment, any software that is directly or indirectly associated with the malware can also be considered a malware. The malware can have a malicious intent, or can cause an error, flaw, failure or fault in a computer program, network, device, or system to produce an incorrect or unexpected result or behave in unintended ways.

The FIG. 3 method can include detecting the presence of the malware within the network, as shown in step 302. In an exemplary embodiment, the node 300 that is performing this step can be a node associated with the network. In an exemplary embodiment, a node associated with the network can be any node within the network. A node can be considered to have malware when it is connected, directly or indirectly, with any part of the network known to have malware.

The FIG. 3 method can include determining whether the malware is associated with the exploitation of the network based on a download history of at least one node associated with the network, as shown in step 304. The download history can include, but is not limited to, information about files/data downloaded from the Internet or an external network, or information about files/data transferred between various nodes within the network. In a non-limiting embodiment, the download history can be stored in a storage offline.

The FIG. 3 method can include comparing ongoing behavior with historic behavior of the network, when the malware is determined to be associated with the exploitation of the network, as shown in step 306. A behavior associated with an exploitation of the network can be compared by establishing a historic behavior and then continuously monitoring the network for unusual events or trends. The comparing of ongoing behavior with historic behavior of the network can include comparing of ongoing behavior with historic behavior of individual nodes of the network and/or any combination of nodes for unusual events or trends.

The FIG. 3 method can include triggering an alert when a deviation between the ongoing behavior and the historic behavior is identified as a result of the comparing, as shown in step 308. The alert 320 can be triggered when a strange event or trend is detected that could indicate the presence of a threat. Examples of strange events can include, but are not limited to, an extraordinary deviation in traffic volume, bandwidth use, and protocol use.

Figure 4:
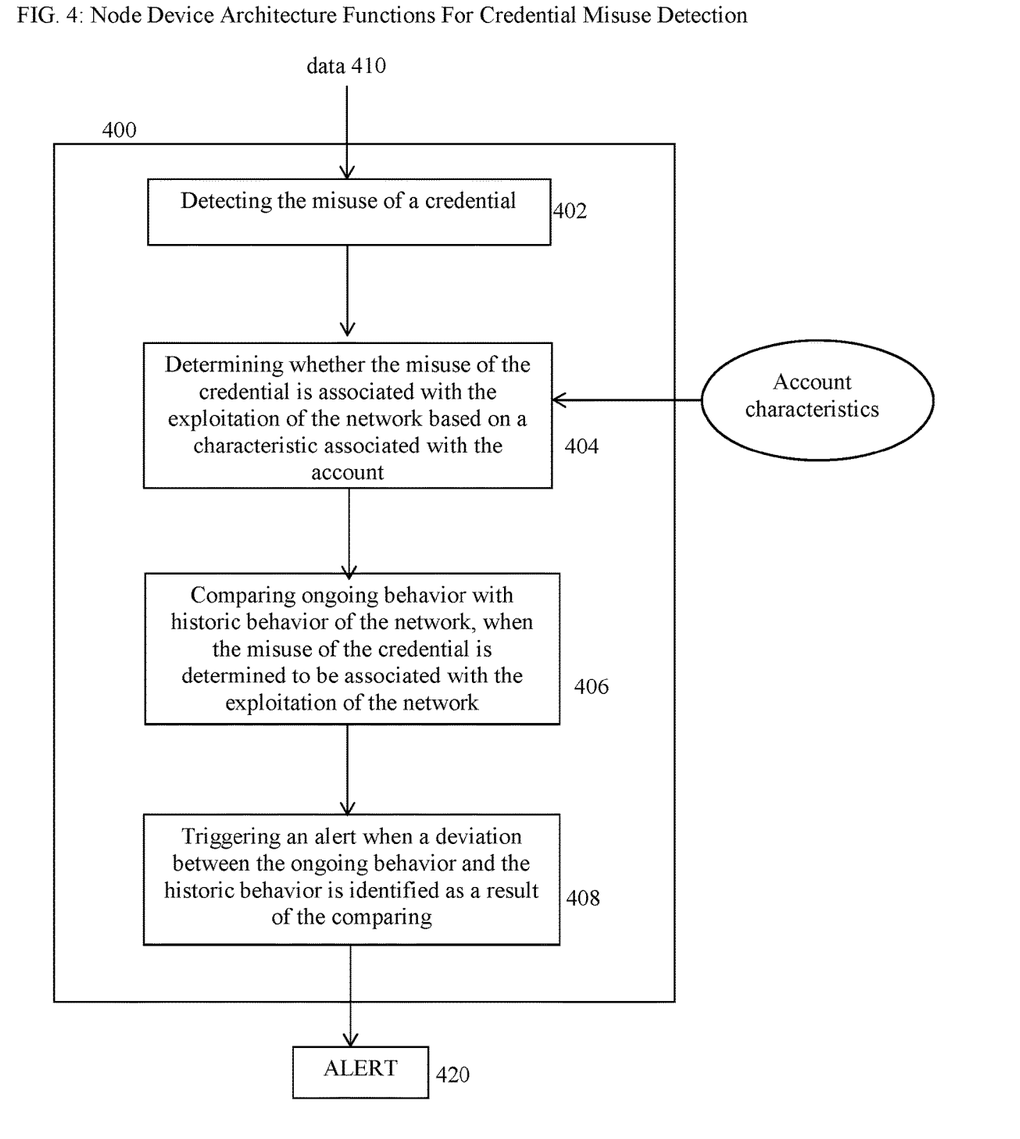
FIG. 4 illustrates exemplary node device architecture functions for implementing credential misuse detection.

FIG. 4 shows an exemplary method that can be implemented by node device architecture(s) according to an embodiment of the present disclosure. The FIG. 4 method can include identifying a misuse of a credential associated with an account as the suspected cyber adversarial event. The credential associated with an account can include, but is not limited to, "username" and a matching "password", and/or a physical security identification card with chip and rfid, and/or can require a second factor for extra security.

A misuse of account credential can include for example, but is not limited to, spoofing techniques used to steal a user's password. The user is presented with an ordinary looking login prompt for username and password, which is actually a malicious program, usually called a Trojan horse under the control of the attacker. When the username and password are entered, this information is logged or in some way passed along to the attacker, breaching security. Another misuse could be the use of a security identification card by the intended assignee of the card or a thief or spoofer of the card where the system identifies an attempt to use the identification card to enter a part of a secure facility for which the intended assignee of the card is not authorized to enter or for whom entering that part of the facility would be highly unusual.

The FIG. 4 method can include detecting the misuse of a credential, as shown in step 402. The misuse of a credential of an account can be any activity that is not authorized by the user(s) of the account or the owner of the system that issued the credential to the user(s) of the account.

The FIG. 4 method can include determining whether the misuse of the credential is associated with the exploitation of the network based on a characteristic associated with the account, as shown in step 404. Characteristics associated with the account can include, but are not limited to, username, password, personal identification number (PIN), and aspect of public key infrastructure (PKI), any cryptography associated with the account.

The FIG. 4 method can include comparing ongoing behavior with historic behavior of the network, when the misuse of the credential is determined to be associated with the exploitation of the network, as shown in step 406.

A behavior associated with an exploitation of the network can be compared by establishing a historic behavior and then continuously monitoring the network for unusual events or trends. The comparing of ongoing behavior with historic behavior of the network can include comparing of ongoing behavior with historic behavior of individual nodes of the network and/or any combination of nodes for unusual events or trends.

The FIG. 4 method can include triggering an alert when a deviation between the ongoing behavior and the historic behavior is identified as a result of the comparing, as shown in step 408. The alert 420 can be triggered when a strange event or trend is detected that could indicate the presence of a threat. Examples of strange events can include, but are not limited to, an extraordinary deviation in traffic volume, bandwidth use, and protocol use.

Figure 5:
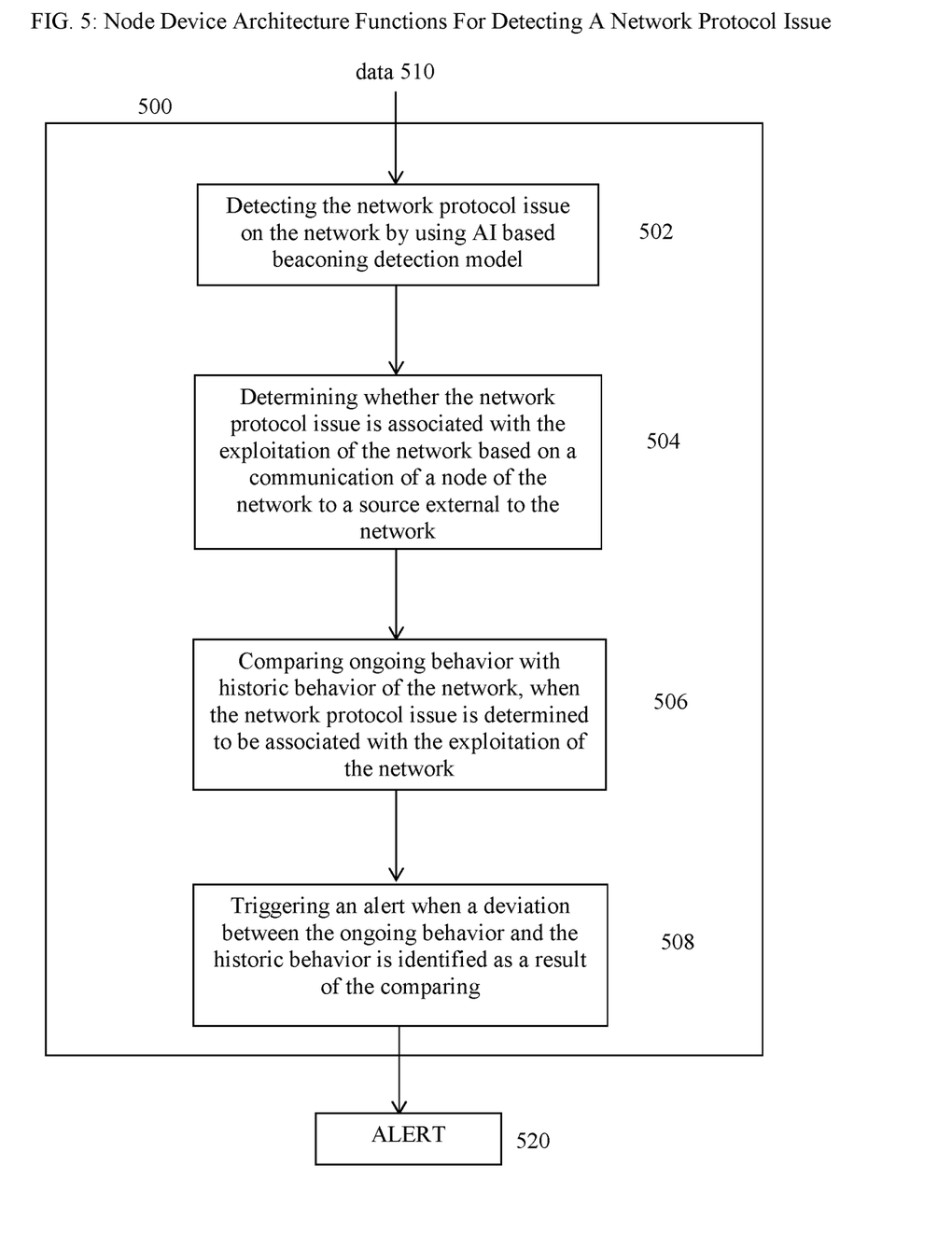
FIG. 5 illustrates exemplary node device architecture functions for implementing a detection of a network protocol issue.

FIG. 5 shows an exemplary method that can be implemented by node device architecture(s) according to an embodiment of the present disclosure. The FIG. 5 method can include identifying a network protocol issue as the suspected cyber adversarial event. The network protocol issue can be related to, but is not limited to, any one or a combination of the rules, syntax, semantics and synchronization of communication in the network and possible error recovery methods. The network protocol issue can be associated with hardware, software, or a combination of both associated with one or more nodes of a network for which data can in some manner be monitored or analyzed, including without limitation, plant and office facilities, physical equipment such as doors and machines, computer and network hardware, software, or a combination of any nodes of a network.

The FIG. 5 method can include detecting the network protocol issue on the network by using AI based beaconing detection model, as shown in step 502. The beaconing detection model can involve using a technique on token-passing networks for monitoring the status of the token-passing process. It can be used, but is not limited to, in token ring and Fiber Distributed Data Interface (FDDI) networks to detect whether the token passing is functioning properly.

The FIG. 5 method can include determining whether the network protocol issue is associated with the exploitation of the network based on a communication of a node of the network to a source external to the network, as shown in step 504. In an exemplary embodiment, the node 500 that is performing this step can be a node associated with the network. In an exemplary embodiment, a node associated with the network can be any node within the network.

The FIG. 5 method can include comparing ongoing behavior with historic behavior of the network, when the network protocol issue is determined to be associated with the exploitation of the network, as shown in step 506.

A behavior associated with an exploitation of the network can be compared by establishing a historic behavior and then continuously monitoring the network for unusual events or trends. The comparing of ongoing behavior with historic behavior of the network can include comparing of ongoing behavior with historic behavior of individual nodes of the network and/or any combination of nodes for unusual events or trends.

The FIG. 5 method can include triggering an alert when a deviation between the ongoing behavior and the historic behavior is identified as a result of the comparing, as shown in step 508. The alert 520 can be triggered when a strange event or trend is detected that could indicate the presence of a threat. Examples of strange events can include, but are not limited to, an extraordinary deviation in traffic volume, bandwidth use, and protocol use.

Figure 6:
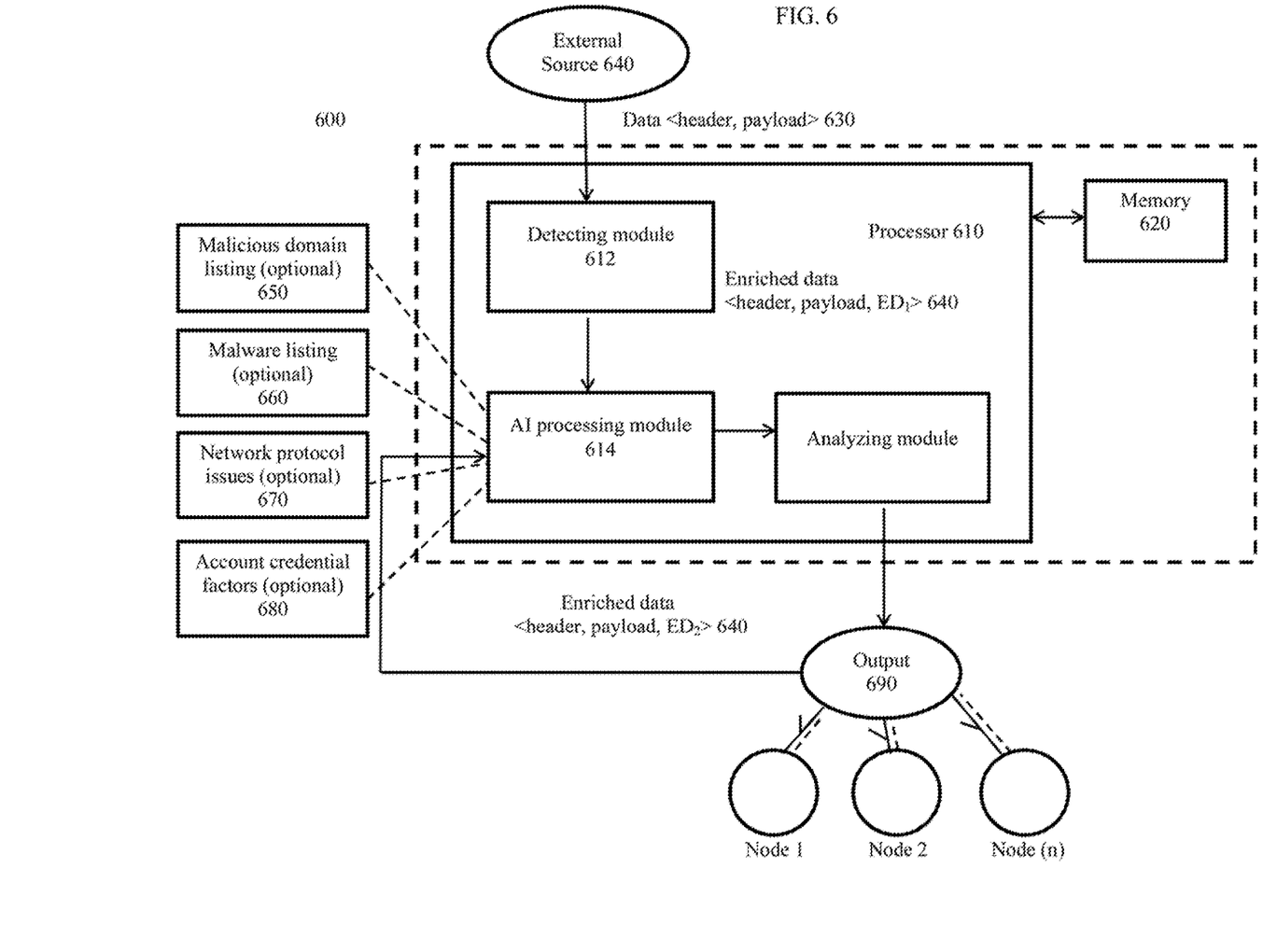
FIG. 6 illustrates exemplary device for securing a network.

FIG. 6 illustrates exemplary system having device 600 with a processor 610 for implementing an embodiment of the present disclosure for performing any of the aforementioned methods. The device 600 can secure a network by applying one or more artificial intelligence (AI) models in a computing environment with a computing speed selected as a function of a bandwidth of the network.

According to an exemplary embodiment, the processor 610 can include a detecting module 612 configured to receive data 630 from a source 640 and detect a suspected cyber adversarial event at a network. In an exemplary embodiment, the source 640 can be wireless such as Wi-Fi or Bluetooth connection and/or wired such as a data bus or a fiber optic cable. In an exemplary embodiment, the data 630 can include payload information, metadata, and/or routing information.

Detecting a suspected cyber adversarial event can include detecting any attempt to expose, alter, disable, destroy, steal or gain unauthorized access to or make unauthorized use of any data, device, or other component of the environment or network that supports information-related activities. Cyber adversarial events can be any type of offensive maneuver that targets computer information systems, infrastructures, computer networks, or personal computer devices. Cyber adversarial events can steal, alter, or destroy a specified target by hacking into a susceptible system. Cyber adversarial events can range from installing spyware on a personal computer to attempting to destroy the infrastructure of entire nations.

Cyber adversarial events can include, but are not limited to, computer and network surveillance, wiretapping, fiber tapping, port scan, idle scan, keystroke logging, screen scraping, backdoor, denial-of-service attack, spoofing, man-in-the-middle attack, man-in-the-browser attack, ARP poisoning, ping flood, ping of death, Smurf attack, buffer overflow, heap overflow, stack overflow, or format string attack.

The processor 610 can include an AI processing module 614 configured to apply an AI model on the data in real-time to enrich the data 630 with information that indicates behavior associated with an exploitation of the network. For example, XGBoost AI model and/or the Bayesian AI model can be used to enrich the data 630 depending on the suspected cyber adversarial event, as described in "Large Scale Machine Learning with Python" by Bastiaan Sjardin, Luca Massaron, Alberto Boschetti, and "Bayesian Model Selection and Statistical Modeling" By Tomohiro Ando, the contents of which are incorporated by reference in their entireties.

In an exemplary embodiment, when the suspected cyber adversarial event is a misuse of a credential associated with an account, the XGBoost model can be used to enrich to the data 630 with information from an account credential source 680 that can include one or more of any combination of an active number of processes running at a node, an average amount of time between activity per user of a network, a number of unique destination computers that that a user connects to, a ratio of a number of successful logins and total logins, a type of authentication (e.g. NTLM, Kerberos), source types, and a number of sources of the data. This enriched data 640 can be used to indicate behavior associated with an exploitation of the network.

For example, in a data stream where a misuse of a credential associated with an account are of concern, one or more data packets, e.g. an Internet Protocol (IP packet), each packet having for example header/routing information and payload information, can be enriched to include any or all of the foregoing information as "enriched" data. In an exemplary embodiment, the enriched data (e.g. active number of processes running at a node) can reflect an abnormally high number of active processes within a given time period. The data packets can be enriched with this information at a specified location within the data packet (e.g. with a select portion of the payload, such as first nodes of bit location or in one or more fields of the data packet).

This enriched data packet 640 would then be analyzed by the analyzing module 616 with access to the XGBoost AI model. The analyzing can include compare the enriched data 640 (e.g. active number of processes at the given node) with a set threshold, which when exceeded results in a successful cyber adversarial event.

The AI processing module 614 can use a successful cyber adversarial event to learn data and data identification patterns, by associating, for example, associating future data item information from the affected node (e.g. a certain address or routing information), such as Node (1), Node (2), Node (n) to the successful cyber adversarial event so that future threats can be assessed in situations where the enriched data does not reflect a successful cyber adversarial event.

For example, a "learned" cyber threat can be deemed to exist where the number of active processes of the given node not deemed to satisfy a threshold of suspicious activity, but the pattern of routing a given number of data packets (e.g. five sequential addressing schemes) replicates that which was first associated with an intelligence threat deemed a successful cyber adversarial event. In other words, the system has learned ways to identify a threat based on the new types of information (e.g. five sequential data packets from a given node being transmitted to the same end node location).

In an exemplary embodiment, when the suspected cyber adversarial event is malware, the Bayesian AI model can be used to enrich the data 630 with information from a malware listing source 660 that includes any combination of processing speed of a node, an active number of processes running at a node, crashing of programs or applications, availability of storage space, frequency of pop-up websites, source types, and number of sources of the data. This enriched data 640 can be used to indicate behavior associated with an exploitation of the network.

For example, in a data stream where a misuse of a credential associated with an account are of concern, one or more data packets, e.g. an Internet Protocol (IP), each having for example header/routing information and payload information can be enriched to include any or all of the foregoing information as "enriched" data. In an exemplary embodiment, the enriched data (e.g. active number of processes running at a node) can reflect an abnormally high number of active processes within a given time period. The data packets can be enriched with this information at a specified location within the data packet (e.g. within a select portion of the payload, such as a first number of bit locations or in one or more dedicated fields of the data packet). For example, an enriched data (ED) packet is illustrated in FIG. 6 as:

<Header; Payload; ED>

This enriched data packet 640 would then be analyzed by the analyzing module 616 with access to the Bayesian AI model. The analyzing can include compare the enriched data 640 (e.g. active number of processes at the given node) with a set threshold, which when exceeded results in a successful cyber adversarial event, as discussed previously in relation to the XGBoost AI model.

The processor 610 can include an analyzing module 616 configured to analyze the enriched data as part of a cyber workflow for an indication of a compromise associated with the exploitation of the network. The cyber workflow can include orchestrated and repeatable patterns of cyber activity enabled by a systematic organization of resources that provide network security. In one embodiment, the cyber workflow can emphasize lateral movement, such that multiple components of the workflow may not be linked to one endpoint and instead extend across a network linked through network traffic.

In an exemplary embodiment, sources of enrichment information connected to the analyzing module 616 can be external or within the device 600. These sources of enrichment information can include, but are not limited to, malicious domain information 650, malware information 660, network protocol issues information 670, and account credential information 680.

According to exemplary embodiments, the processor 610 can be configured to categorize the suspected cyber adversarial event as an attempted cyber adversarial event or a successful cyber adversarial event based on the analyzing of the enriched data 640. The processor 610 can be configured to output 690 only the successful cyber adversarial event to reduce false positives for non-existent cyber adversarial events. Alternatively, both the successful cyber adversarial event and the attempted cyber adversarial event are outputted 690. The output can be stored in the memory 620.

The output 690 of the successful cyber adversarial event can be in the form of a display on a monitor, and/or an alarm sound, and/or any other output that alerts the nodes (node 1, node 2, . . . node(n)) of the network, and/or any equivalents thereof. In an exemplary embodiment, one or more nodes associated with the successful cyber adversarial event can be quarantined and/or removed from the network and/or equivalents thereof using for example network routers and switches that control the access of a node to the network.

According to exemplary embodiments, the processor 610 can be at least a one of a scalable processor, parallelizable processor, and optimized for multi-thread processing capabilities. The processor 610 can be a graphics processing unit (GPU). The processor 610 can be a supercomputer or a quantum computer whose processing power is selected as a function of anticipated network traffic (e.g. data flow). According to exemplary embodiments, the source 640 can be external to a network associated with the device 600. The source 640 can be within a network associated with the device.

The processor 610 can include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates.

Various functional aspects of the processor 610 may be implemented solely as software or firmware associated with the processor 610. The processor can have an optional associated memory 620, which can be volatile (such as RAM), non-volatile (such as ROM, flash memory, etc.) or some combination of the two. The computer memory includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device.

According to exemplary embodiments, an implementation of any of the aforementioned methods can be stored on a non-transitory computer-readable medium. The term "computer-readable medium" (or "machine-readable medium") as used herein is an extensible term that refers to any medium or any memory, that participates in providing instructions to a processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission media.

Transmission media includes coaxial cables, copper wire and fiber optics, including the wires that include or form a bus. Transmission media can also take the form of acoustic or light waves, such as those generated during radio-wave and infrared data communications, or other form of propagated signals (e.g., carrier waves, infrared signals, digital signals, etc.). Forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method for securing a network by applying one or more artificial intelligence (AI) models in a computing environment with a computing speed selected as a function of a bandwidth of the network, the method comprising:
   receiving data at a node associated with the network;
   identifying a suspected cyber adversarial event on the network;
   applying an AI model on the data in real-time to enrich the data with information that indicates behavior associated with an exploitation of the network;
   analyzing the enriched data as part of a cyber workflow for an indication of a compromise associated with the exploitation of the network, wherein the cyber workflow is an orchestrated and repeatable pattern of suspicious cyber activity in the network;
   categorizing the suspected cyber adversarial event as an attempted cyber adversarial event when the suspected cyber adversarial event has no consequences on the network and a successful cyber adversarial event when the suspected adversarial event results in an exploitation of the network, the exploitation of the network leading to the node being an affected node;
   learning data identification patterns of the successful cyber adversarial event by associating future data item information from the affected node to the successful cyber adversarial event and comparing behavior of the affected node to a baseline behavior of other nodes within the network; and
   assessing future threats when the enriched data does not reflect a successful cyber adversarial event based on future data item information.

2. The method of claim 1, comprising:
categorizing the suspected cyber adversarial event based on the analyzing of the enriched data; and
outputting the successful cyber adversarial event.

3. The method of claim 1, comprising:
receiving the data from a source external to the network.

4. The method of claim 1, comprising:
receiving the data from a source within the network.

5. The method of claim 1, comprising:
using an adaptive AI model as the AI model.

6. The method of claim 1, comprising:
identifying navigation to a malicious domain as the suspected cyber adversarial event.

7. The method of claim 6, comprising:
detecting whether a node associated with the network has navigated to the malicious domain;
determining whether the malicious domain is associated with the exploitation of the network based on intelligence of existing threats;
comparing ongoing behavior with historic behavior of the network, when the node is detected to have navigated to the malicious domain and is determined to be associated with an exploitation mechanism; and
triggering an alert when a deviation between the ongoing behavior and the historic behavior is identified as a result of the comparing.

8. The method of claim 1, comprising:
identifying a presence of a malware as the suspected cyber adversarial event.

9. The method of claim 8, comprising:
detecting the presence of the malware within the network;
determining whether the malware is associated with the exploitation of the network based on a download history of at least one node associated with the network;
comparing ongoing behavior with historic behavior of the network, when the malware is determined to be associated with the exploitation of the network; and
triggering an alert when a deviation between the ongoing behavior and the historic behavior is identified as a result of the comparing.

10. The method of claim 1, comprising:
identifying a misuse of a credential associated with an account as the suspected cyber adversarial event.

11. The method of claim 10, comprising:
detecting the misuse of a credential;

determining whether the misuse of the credential is associated with the exploitation of the network based on a characteristic associated with the account;

comparing ongoing behavior with historic behavior of the network, when the misuse of the credential is determined to be associated with the exploitation of the network; and triggering an alert when a deviation between the ongoing behavior and the historic behavior is identified as a result of the comparing.

12. The method of claim 1, comprising:
identifying a network protocol issue as the suspected cyber adversarial event.

13. The method of claim 12, comprising:
detecting the network protocol issue on the network by using beaconing detection model;

determining whether the network protocol issue is associated with the exploitation of the network based on a communication of a node of the network to a source external to the network;

comparing ongoing behavior with historic behavior of the network, when the network protocol issue is determined to be associated with the exploitation of the network; and triggering an alert when a deviation between the ongoing behavior and the historic behavior is identified as a result of the comparing.

14. The method of claim 1, comprising:
applying multiple AI models in a parallel processing framework.

15. The method of claim 1, wherein the cyber workflow is based on one of malware detection, malicious domain detection, credential misuse detection, or network protocol issue detection.

16. A computing environment having at least one processor configured to implement the method of claim 1.

17. A device for securing a network by applying one or more artificial intelligence (AI) models in a computing environment with a computing speed selected as a function of a bandwidth of the network, comprising:
a processor configured to:
receive data from a source;
identify a suspected cyber adversarial event on the network;
apply an adaptive AI model on the data in real-time to enrich the data with information that indicates behavior associated with an exploitation of the network;
analyze the enriched data as part of a cyber workflow for an indication of a compromise associated with the exploitation of the network, wherein the cyber workflow is an orchestrated and repeatable pattern of suspicious cyber activity in the network;
categorizing the suspected cyber adversarial event as an attempted cyber adversarial event when the suspected cyber adversarial event has no consequences on the network and a successful cyber adversarial event when the suspected adversarial event results in an exploitation of the network, the exploitation of the network leading to the source being an affected source;

learn data identification patterns of the successful cyber adversarial event by associating future data item information from the affected source to the successful cyber adversarial event and comparing behavior of the affected source to a baseline behavior of other sources within the network; and assessing future threats when the enriched data does not reflect a successful cyber adversarial event based on future data item information.

18. The device of claim 17, wherein the processor is configured to categorize the suspected cyber adversarial event based on the analyzing of the enriched data, and output the successful cyber adversarial event.

19. The device of claim 17, wherein the source is external to a network associated with the device.

20. The device of claim 17, wherein the source is within a network associated with the device.

21. The device of claim 17, wherein the processor is one of a graphics processing unit, a scalable processor, parallelizable processor, and optimized for multi-thread processing capabilities.

22. A non-transitory computer-readable medium having computer-executable instructions for securing a network by applying one or more artificial intelligence (AI) models in a computing environment with a computing speed selected as a function of a bandwidth of the network, wherein the computer-executable instructions are executed on a processor and comprise the steps of:
receiving data at a node associated with the network;
identifying a suspected cyber adversarial event on the network;
applying an AI model on the data in real-time to enrich the data with information that indicates behavior associated with an exploitation of the network;
analyzing the enriched data as part of a cyber workflow for an indication of a compromise associated with the exploitation of the network, wherein the cyber workflow is an orchestrated and repeatable pattern of a suspicious cyber activity in the network, wherein the cyber workflow is an orchestrated and repeatable pattern of a suspicious cyber activity in the network;
categorizing the suspected cyber adversarial event as an attempted cyber adversarial event when the suspected cyber adversarial event has no consequences on the network and a successful cyber adversarial event when the suspected adversarial event results in an exploitation of the network, the exploitation of the network leading to the node being an affected node;
learning data identification patterns of the successful cyber adversarial event by associating future data item information from the affected node to the successful cyber adversarial event and comparing behavior of the affected node to a baseline behavior of other nodes within the network; and
assessing future threats when the enriched data does not reflect a successful cyber adversarial event based on future data item information.

* * * * *